Patented July 26, 1932

1,868,919

UNITED STATES PATENT OFFICE

OTTO SCHMIDT AND OTTO GROSSKINSKY, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CARBON BLACK

No Drawing. Application filed December 26, 1928, Serial No. 328,613, and in Germany December 31, 1927.

This invention relates to improvements in the manufacture and production of carbon black.

Carbon black has hitherto been almost exclusively produced by the incomplete combustion of hydrocarbons. There are however, very great drawbacks in this method, because a considerable portion of the initial materials is always burned away in the process, and another portion becomes graphitized by the large amount of heat produced in the combustion, so that, under certain conditions, a considerable amount of the carbon black is rendered unsuitable for finer uses, such as for coloring purposes or in the rubber industry, and the like.

We have now found that these drawbacks are obviated and very high grade carbon black is obtained by treating hydrocarbons of unsaturated character, such as olefines, diolefines, and in particular the gaseous unsaturated hydrocarbons, or gases containing the same, with dehydrogenating catalysts preferably comprising a metal of the iron group, which expression includes a compound of the metal, such as an oxide, at a low or a moderately elevated decomposition temperature, for example, at temperatures of between about 100° and 300° C., but usually at temperatures of between about 300° and 450° C., and, if desired, at temperatures of up to about 500° C., but not exceeding 800° C. and under elevated pressure, in the gaseous phase and in the presence or absence of other gases or vapors, such as hydrogen, nitrogen, carbon monoxide, carbon dioxide, water vapor, methane, ethane, naphthalene, nitrogen peroxide and the like. Hydrogen does not exert a hydrogenating action under the conditions of working employed according to our invention because most of the unsaturated hydrocarbons under treatment ultimately undergo decomposition to carbon black and no substantial formation of saturated hydrocarbons takes place by the action of said hydrogen. The said unsaturated hydrocarbons may also be derived from the thermal decomposition or partial combustion of gaseous aliphatic hydrocarbons, such as methane, ethane or propane or of gases containing the same, for example, natural gases, such as occur so abundantly in the United States of America. In particular, if hydrogen be employed when working under pressure very low temperatures, for example 25° C. or above are suitable.

A pressure higher than atmospheric, for example, of 30, 50, 100 or even more atmospheres is very suitable for application in the process according to the present invention. The metals of the iron group, namely cobalt, nickel or iron, serving as catalysts according to the present invention may be employed either alone or in conjunction with other additions. Metal oxides, such as cobalt oxide, nickel oxide or iron oxide and the like, preferably in a reduced state, to which still further substances having an activating action may be added, are also suitable for employment as catalysts. Suitable additions comprise, for example, metal oxides or hydroxides, such as cadmium oxide, copper oxide, vanadium oxide, chromic oxide, zinc oxide, uranium oxide, alumina, manganous oxides, caustic alkalies, and the like, or salts, such as silicates, chromates, molybdates, tungstates, or the like. As excellent catalysts may be mentioned catalysts containing cobalt, which may be obtained by reduction of compounds of cobalt with hydrogen at a moderately elevated temperature, and which may be provided with activating additions, such as the oxides or hydroxides of zinc, cadmium, copper, chromium, vanadium, molybdenum, uranium and the metals of the alkalies and the alkaline earths. The catalysts may be employed in a homogeneous state or in conjunction with carriers. Catalysts which have been subjected to a moulding process are particularly advantageous.

Among the unsaturated hydrocarbons, the olefines, such as ethylene and its homologues, are particularly suitable, but diolefines, such as butadiene and its homologues, may also be used as the initial materials, and saturated hydrocarbons, such as ethane, propane, benzine fractions and the like may also be added. It is often advisable to take care that the carbon black formed during the decomposition is removed from the reaction chamber as quickly as possible. This is most easily effected by mechanical means, though the removal may also be effected by maintaining the highest possible gas velocity in the reaction zone. Useful carbon black may, however, also be produced without these precautionary measures.

Particularly excellent results are obtained according to this method of working with catalysts containing cobalt. The carbon black obtained according to this method of working is distinguished by its particles having a very small size, that is to say, of its having a very fine state of dispersion. On this account it has a very deep black color and is suitable as an admixture in the vulcanization of rubber articles, such as are produced both from crude rubber and from the plastic or resilient polymerization products of diolefines.

The carbon black produced by the decomposition of unsaturated hydrocarbons according to the process of the present invention, and in particular that obtained in the presence of catalysts containing cobalt, is adapted for the production of colored compositions, such as printing inks, endorsing inks and the like, and as already stated, also for use in the rubber industry. The said carbon black is very similar in its properties to that obtained by partial combustion of hydrocarbons, and is thus considerably superior in its properties to the carbon blacks which have hitherto been obtained by other processes of thermal decomposition. Moreover, since the carbon black prepared in this manner is far more easily and conveniently obtainable than that hitherto prepared by partial combustion, its application for the said purposes constitutes a substantial technical improvement.

The employment of elevated pressures has the great advantage, that a maximum decomposition of the unsaturated hydrocarbons is obtained in a minimum of time and in a minimum of space in the reaction vessel. Furthermore only very small amounts of catalyst substances are required. Carbon black of very good quality is thus obtained.

The following examples will further illustrate how the said invention may be carried out in practice, though it is understood that the invention is not limited to these merely typical examples. The parts are by weight unless otherwise stated.

Example 1

Ethylene, at a temperature of 400° C. and under a pressure of 60 atmospheres, is passed over a catalyst consisting of kieselguhr on which nickel has been deposited in a finely divided state. After a short time, the process is interrupted, and the large deposit of carbon black is removed from the reaction chamber. This carbon black has excellent properties.

The decomposition of the ethylene being accompanied by a considerable evolution of heat, the reaction proceeds automatically when once started, and suitable measures must be taken for a suitable removal of heat. The carbon black can also be produced at temperatures below 400° C.

A similar procedure is adopted when other catalysts and other hydrocarbons of the kind mentioned are employed. If 20 parts of the carbon black thus obtained be mixed with 100 parts of a plastic polymerization product of butadiene obtained by means of sodium and 15 parts of magnesium carbonate, 5 parts of sulphur, 3 parts of stearic acid and 3 parts of a resin in a roller mill and the mixture be vulcanized for 40 minutes at about 140° C., a vulcanizate of good elasticity and high tensile strength is obtained.

Example 2

A mixture of 2 parts by volume of ethylene with an addition of 1 part by volume of hydrogen, compressed at 90 atmospheres, is passed, at a temperature of about 100° C., over a catalyst composed of finely divided nickel deposited on kieselguhr. The ethylene decomposes, with violent liberation of heat and an increase in pressure, into methane and carbon, the latter being obtained in the form of a highly valuable carbon black, practically free from nickel. The amount of the hydrogen originally employed suffers practically no change, and there is practically no ethane present in the reaction gases. In this case also, care must be taken, by cooling, to prevent the rise in temperature becoming excessive.

The hydrogen may be replaced by other diluents, such as carbon monoxide, carbon dioxide, steam, methane, nitrogen, and the like.

The nickel may also be replaced by cobalt or iron or the like which, when employed in a fine, coarse or activated condition, also furnish good results. The formation of carbon black can also be effected by adding small amounts of nickel carbonyl, iron carbonyl, or other volatile compounds of metals of the iron group, and heating. The carbon black thus obtained is deep black in color and 100 cubic centimeters of the loosely heaped product weigh about 10 grams. The product has the property of imparting a particularly high elasticity to rubber or polymerization products of diolefines when employed as an admixture therewith.

Thus, if 100 parts of a plastic polymerization product of butadiene together with 25 parts of magnesium oxide, 5 parts of sulphur and 0.5 part of a vulcanizing accelerator be intimately mixed with 40 parts of the carbon black prepared from ethylene in the manner described and the resulting sheet be vulcanized for 15 minutes at about 140° C., a technically valuable vulcanizate of high elasticity is obtained.

What we claim is:—

1. A process for the production of carbon black from unsaturated hydrocarbons, which comprises treating the said initial material in the gaseous phase and under an elevated pressure with a dehydrogenating catalyst comprising a metal of the iron group at a low to moderately elevated decomposing temperature.

2. A process for the production of carbon black from unsaturated hydrocarbons, which comprises treating the said initial material in the gaseous phase and under an elevated pressure with a dehydrogenating catalyst comprising a metal of the iron group at a low to moderately elevated decomposing temperature not exceeding 800° C.

3. A process for the production of carbon black from unsaturated hydrocarbons, which comprises treating a gas comprising a substantial amount of the said initial material in the gaseous phase and under an elevated pressure with a dehydrogenating catalyst comprising a metal of the iron group at a low to moderately elevated decomposing temperature up to about 500° C.

4. A process for the production of carbon black from unsaturated hydrocarbons, which comprises treating the said initial material in the gaseous phase and under an elevated pressure with a dehydrogenating catalyst comprising a metal of the iron group at a temperature of between 300° and 450° C.

5. A process for the production of carbon black from unsaturated hydrocarbons, which comprises treating the said initial material in the gaseous phase and under a pressure of at least 30 atmospheres, with a catalyst comprising a metal of the iron group at a low to moderately elevated decomposing temperature up to about 500° C.

6. A process for the production of carbon black from ethylene, which comprises treating a gas comprising substantial amounts of ethylene under a pressure of at least 30 atmospheres with a dehydrogenating catalyst comprising a metal of the iron group at a low to moderately elevated decomposing temperature up to about 500° C.

7. A process for the production of carbon black from ethylene, which comprises treating a gas comprising substantial amounts of ethylene under a pressure of at least 30 atmospheres with a dehydrogenating catalyst comprising cobalt at a temperature of between 300° and 450° C.

8. A process for the production of carbon black from unsaturated hydrocarbons, which comprises treating said initial materials in the gaseous phase and under an elevated pressure and at a temperature between 300° and 500° C. with a dehydrogenating catalyst comprising a metal selected from the group consisting of cobalt and nickel.

9. A process for the production of carbon black from ethylene, which comprises treating a gas comprising substantial amounts of ethylene under an elevated pressure and at a temperature between 300° and 500° C. with a dehydrogenating catalyst comprising a metal selected from the group consisting of cobalt and nickel.

In testimony whereof we have hereunto set our hands.

OTTO SCHMIDT.
OTTO GROSSKINSKY.